(12) United States Patent
Choi et al.

(10) Patent No.: US 12,273,024 B2
(45) Date of Patent: Apr. 8, 2025

(54) COMMON MODE ELECTROMAGNETIC INTERFERENCE MITIGATION

(71) Applicants: Seungdeog Choi, Starkville, MS (US); Ashik Amin, Starkville, MS (US)

(72) Inventors: Seungdeog Choi, Starkville, MS (US); Ashik Amin, Starkville, MS (US)

( * ) Notice: Subject to any disclaimer, the term of this patent is extended or adjusted under 35 U.S.C. 154(b) by 588 days.

(21) Appl. No.: 17/495,585

(22) Filed: Oct. 6, 2021

(65) Prior Publication Data

US 2022/0216784 A1 Jul. 7, 2022

Related U.S. Application Data

(60) Provisional application No. 63/089,993, filed on Oct. 9, 2020.

(51) Int. Cl.
*H02M 1/44* (2007.01)
*G05F 1/613* (2006.01)
*H02M 1/12* (2006.01)
*H02M 7/5387* (2007.01)
*H02M 7/797* (2006.01)
*H02M 1/00* (2007.01)

(52) U.S. Cl.
CPC ............ *H02M 1/44* (2013.01); *H02M 1/123* (2021.05); *G05F 1/613* (2013.01); *H02M 1/0043* (2021.05); *H02M 7/53871* (2013.01); *H02M 7/797* (2013.01)

(58) Field of Classification Search
CPC .......... H02M 7/797; H02M 1/08; H02M 1/44; H02M 1/123; H02M 1/0043; H02M 7/53871; G05F 1/613
See application file for complete search history.

(56) References Cited

U.S. PATENT DOCUMENTS 6,992,894 B1 1/2006 Mease et al.
7,643,965 B2 1/2010 Zhang
8,196,078 B2 6/2012 Chen et al.
(Continued)

FOREIGN PATENT DOCUMENTS

CN 1808153 A 7/2006
CN 110113052 A * 8/2019 .......... H03M 1/1245
(Continued)

OTHER PUBLICATIONS

MÃ¼ller et al. ("An Active Common Mode EMI Filter Approach introducing Predictive Pulsed Compensation," 2019 International Symposium on Electromagnetic Compatibility—EMC Europe, Barcelona, Spain, 2019, pp. 1003-1008, doi: 10.1109/EMCEurope.2019. 8872104.) (Year: 2019).*
(Continued)

*Primary Examiner* — Lisa M Caputo
*Assistant Examiner* — Christian T Bryant
(74) *Attorney, Agent, or Firm* — Conley Rose, P.C.

(57) ABSTRACT

A mechanism for mitigating electromagnetic interference (EMI) in a network of power converters is disclosed. A controller sends a first control signal to instruct a first power converter to generate a first EMI signal at a first phase. The controller sends a second control signal to instruct a second power converter to generate a second EMI signal at a second phase selected to destructively interfere with the first EMI signal at the first phase.

17 Claims, 5 Drawing Sheets

(56) References Cited

U.S. PATENT DOCUMENTS

| | | | |
|---|---|---|---|
| 2006/0043979 A1 | 3/2006 | Wu | |
| 2013/0070501 A1* | 3/2013 | Sardat | H02M 7/06 363/126 |
| 2014/0063872 A1* | 3/2014 | Hamza | H02M 1/44 363/39 |
| 2016/0049867 A1* | 2/2016 | Liu | H02M 1/42 363/39 |
| 2020/0036286 A1* | 1/2020 | Giuliano | H02M 1/42 |

FOREIGN PATENT DOCUMENTS

| | | | | |
|---|---|---|---|---|
| EP | 1584134 B1 * | 3/2017 | | H02P 6/085 |
| JP | 5067594 B2 | 10/2006 | | |

OTHER PUBLICATIONS

Natarajan et al. ("A State-of-the-Art Review on Conducted Electromagnetic Interference in Non-Isolated DC to DC Converters," in IEEE Access, vol. 8, pp. 2564-2577, 2020, doi: 10.1109/ACCESS. 2019.2961954.) (Year: 2020).*

Tallam et al. ("Common-Mode Voltage Reduction PWM Algorithm for AC Drives," in IEEE Transactions on Industry Applications, vol. 46, No. 5, pp. 1959-1969, Sep.-Oct. 2010, doi: 10.1109/TIA.2010. 2057396.) (Year: 2010).*

Yang et al. ("Common-Mode EMI Noise Analysis and Reduction for ACâDCâAC Systems With Paralleled Power Modules," in IEEE Transactions on Power Electronics, vol. 35, No. 7, pp. 6989-7000, Jul. 2020, doi: 10.1109/TPEL.2019.2957358.) (Year: 2020).*

Wikipedia ("Electric power conversion." Wikipedia, The Free Encyclopedia. Wikipedia, The Free Encyclopedia, Dec. 6, 2019.) (Year: 2019).*

Cochrane et al. ("Passive cancellation of common-mode noise in power electronic circuits," in IEEE Transactions on Power Electronics, vol. 18, No. 3, pp. 756-763, May 2003, doi: 10.1109/TPEL. 2003.810858.) (Year: 2003).*

Xie et al. ("Reducing Common Mode Noise in Phase-Shifted Full-Bridge Converter," in IEEE Transactions on Industrial Electronics, vol. 65, No. 10, pp. 7866-7877, Oct. 2018, doi: 10.1109/ TIE.2018.2803761) (Year: 2018).*

J. Millán, P. Godignon, X. Perpiñà, A. Pérez-Tomás and J. Rebollo, "A Survey of Wide Bandgap Power Semiconductor Devices," in IEEE Trans. on Power Electronics, vol. 29, No. 5, pp. 2155-2163, May 2014.

F. F. Wang and Z. Zhang, "Overview of silicon carbide technology: Device, converter, system, and application," in CPSS Transactions on Power Electronics and Applications, vol. 1, No. 1, pp. 13-32, Dec. 2016.

H. Akagi and T. Doumoto, "A passive EMI filter for preventing high-frequency leakage current from flowing through the grounded inverter heat sink of an adjustable-speed motor drive system," in IEEE Transactions on Industry Applications, vol. 41, No. 5, pp. 1215-1223, Sep.-Oct. 2005.

G. L. Skibinski, R. J. Kerkman and D. Schlegel, "EMI emissions of modern PWM AC drives," in IEEE Industry Applications Magazine, vol. 5, No. 6, pp. 47-80, Nov.-Dec. 1999.

S. U. Hasan and G. E. Town, "An Aperiodic Modulation Method to Mitigate Electro-magnetic Interference in Impedance Source DC—DC Converters," in IEEE Transactions on Power Electronics, vol. 33, No. 9, pp. 7601-7608, Sep. 2018.

J. Biela, A. Wirthmueller, R. Waespe, M. L. Heldwein, K. Raggl and J. W. Kolar, "Passive and Active Hybrid Integrated EMI Filters," in IEEE Trans. on Power Electronics, vol. 24, No. 5, pp. 1340-1349, May 2009.

S. Wang, Y. Y. Maillet, F. Wang, D. Boroyevich and R. Burgos, "Investigation of Hybrid EMI Filters for Common-Mode EMI Suppression in a Motor Drive System," in IEEE Transactions on Power Electronics, vol. 25, No. 4, pp. 1034-1045, Apr. 2010.

S. Wang, Y. Y. Maillet, F. Wang, R. Lai, F. Luo and D. Boroyevich, "Parasitic Effects of Grounding Paths on Common-Mode EMI Filter's Performance in Power Electronics Systems," in IEEE Transactions on Industrial Electronics, vol. 57, No. 9, pp. 3050-3059, Sep. 2010.

S. Agrawal and R. S. Kanchan, "Carrier Phase Shift Modulation for Reducing the Common Mode Voltage in a Two-Level Three-Phase Inverter," IECON 2018—44th Annual Conference of the IEEE Industrial Electronics Society, Washington, DC, USA, 2018.

C. Zhu and T. H. Hubing, "An Active Cancellation Circuit for Reducing Electrical Noise from Three-Phase AC Motor Drivers," in IEEE Transactions on Electromagnetic Compatibility, vol. 56, No. 1, pp. 60-66, Feb. 2014.

Chenggang Mei, J. C. Balda and W. P. Waite, "Cancellation of common-mode Voltages for induction motor drives using active method," in IEEE Transactions on Energy Conversion, vol. 21, No. 2, pp. 380-386, Jun. 2006.

D. Barater, G. Buticchi, E. Lorenzani and C. Concari, "Active Common-Mode Filter for Ground Leakage Current Reduction in Grid-Connected PV Converters Operating With Arbitrary Power Factor," in IEEE Transactions on Industrial Electronics, vol. 61, No. 8, pp. 3940-3950, Aug. 2014.

Y. Chu and S. Wang, "A Generalized Common-Mode Current Cancelation Approach for Power Converters," in IEEE Transactions on Industrial Electronics, vol. 62, No. 7, pp. 4130-4140, Jul. 2015.

X. Gong and J. A. Ferreira, "Investigation of Conducted EMI in SiC JFET Inverters Using Separated Heat Sinks," in IEEE Transactions on Industrial Electronics, vol. 61, No. 1, pp. 115-125, Jan. 2014.

D. Han, C. T. Morris and B. Sarlioglu, "Common-Mode Voltage Cancellation in PWM Motor Drives With Balanced Inverter Topology," in IEEE Transactions on Industrial Electronics, vol. 64, No. 4, pp. 2683-2688, Apr. 2017.

A. L. Julian, G. Oriti and T. A. Lipo, "Elimination of common-mode voltage in three-phase sinusoidal power converters," in IEEE Trans. on Power Electronics, vol. 14, No. 5, pp. 982-989, Sep. 1999.

A. von Jauanne and Haoran Zhang, "A dual-bridge inverter approach to eliminating common-mode voltages and bearing and leakage currents," in IEEE Trans. on Power Elec., vol. 14, No. 1, pp. 43-48, Jan. 1999.

Dawson, "Your Tesla Can Go Zero to 60 in 2.5 Seconds But Can't Get AM Radio," https://www.wsj.com/articles/your-tesla-can-go-zero-to-60-in-2-5-seconds-but-cant-get-am-radio, Nov. 6, 2018, 6 pages.

* cited by examiner

COMMON MODE ELECTROMAGNETIC INTERFERENCE MITIGATION

CROSS-REFERENCE TO RELATED APPLICATIONS

This patent application claims the benefit of U.S. Provisional Patent Application No. 63/089,993 filed Oct. 9, 2020 by Seungdeog Choi, et al., and titled "Common Mode EMI Modeling and Mitigation Techniques," which is hereby incorporated by reference.

STATEMENT REGARDING FEDERALLY SPONSORED RESEARCH OR DEVELOPMENT

This invention was made with government support under Grant No. N00014-16-1-2956 awarded by the Office of Naval Research. The government has certain rights in the invention.

BACKGROUND

Modern energy systems employ numerous inter-connected powered components. For example, electric vehicles and/or hybrid electric vehicles such as automobiles, aircraft, drones, ships, etc. may employ many interconnected electric devices with different power constraints. Such electric devices may be designed for alternating current (AC) and/or direct current (DC). Further, such devices may have different input voltage, current, and/or power constraints. In order to ensure such devices operate properly, various electric components can be employed to convert electric energy from one form to another. Devices that perform such conversions create leakage currents as a side effect of their high frequency operation. Further, such systems share a ground plane that is generally not connected to a true earth ground. As such, the leakage currents can combine in the common/shared ground plane to interfere with the operation of the electric components.

SUMMARY

In an embodiment, the disclosure includes a method. The method comprises sending a first control signal to instruct a first power converter to generate a first EMI signal at a first phase; and sending a second control signal to instruct a second power converter to generate a second EMI signal at a second phase selected to destructively interfere with the first EMI signal at the first phase.

In an embodiment, the disclosure includes a controller. The controller is configured to: send a first control signal to instruct a first power converter to generate a first EMI signal at a first phase; and send a second control signal to instruct a second power converter to generate a second EMI signal at a second phase selected to destructively interfere with the first EMI signal at the first phase.

In an embodiment, the disclosure includes a non-transitory computer readable medium. The non-transitory computer readable medium comprises a computer program product for use by a controller, the computer program product comprising computer executable instructions stored on the non-transitory computer readable medium such that when executed by a processor cause the controller to: send a first control signal to instruct a first power converter to generate a first EMI signal at a first phase; and send a second control signal to instruct a second power converter to generate a second EMI signal at a second phase selected to destructively interfere with the first EMI signal at the first phase.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

As discussed above, leakage currents may cause problems in complex electrical networks. For example, an electric network may include multiple power converters that step voltage up and/or down, convert AC power to DC power, convert DC power to AC power, etc. These power converters use various semiconductor-based switches that are controlled by gate drivers. The power converters function by using the gate drivers to alternate the switches between states (e.g., on and off). Each time a switch alternates between states, the sharp change of voltage results in electromagnetic interference (EMI) leakage current through the switching parasitic capacitance. Wide-bandgap (WBG) semiconductors may be used in such switches. WBG semiconductors operate at higher voltages, frequencies, and temperatures than other semiconductors. Since WBG semiconductors operate at higher frequencies, the state of the switch changes faster resulting in more leakage current. Further, operation at higher voltages can also lead to greater leakage currents. As a result, WBG semiconductors are less immune to EMI comparative to other semiconductors. Further, a power converter network may share a ground plane that is not connected to a true earth ground. When many WBG semiconductors are employed in a power converter network with a shared ground plane, the leakage currents may add together in the ground plane to create enough EMI to interfere with the function of electrical components operating in the system. For example, the use of WBG semiconductors in power converters in an electrical automobile can create enough EMI to block the use of amplitude modulation/frequency modulation (AM/FM) radio functionality by overwhelming the radio receiver. One way to mitigate such issues is to attach an EMI filter to each power converter. EMI filters filter out EMI at various frequencies. WBG semiconductor based power converters may create EMI over a broad frequency spectrum. Accordingly, EMI filters for WBG semiconductor based power converters may be large, complex, and expensive due to the complexity of filtering out the EMI at the corresponding frequencies.

Figure 6:
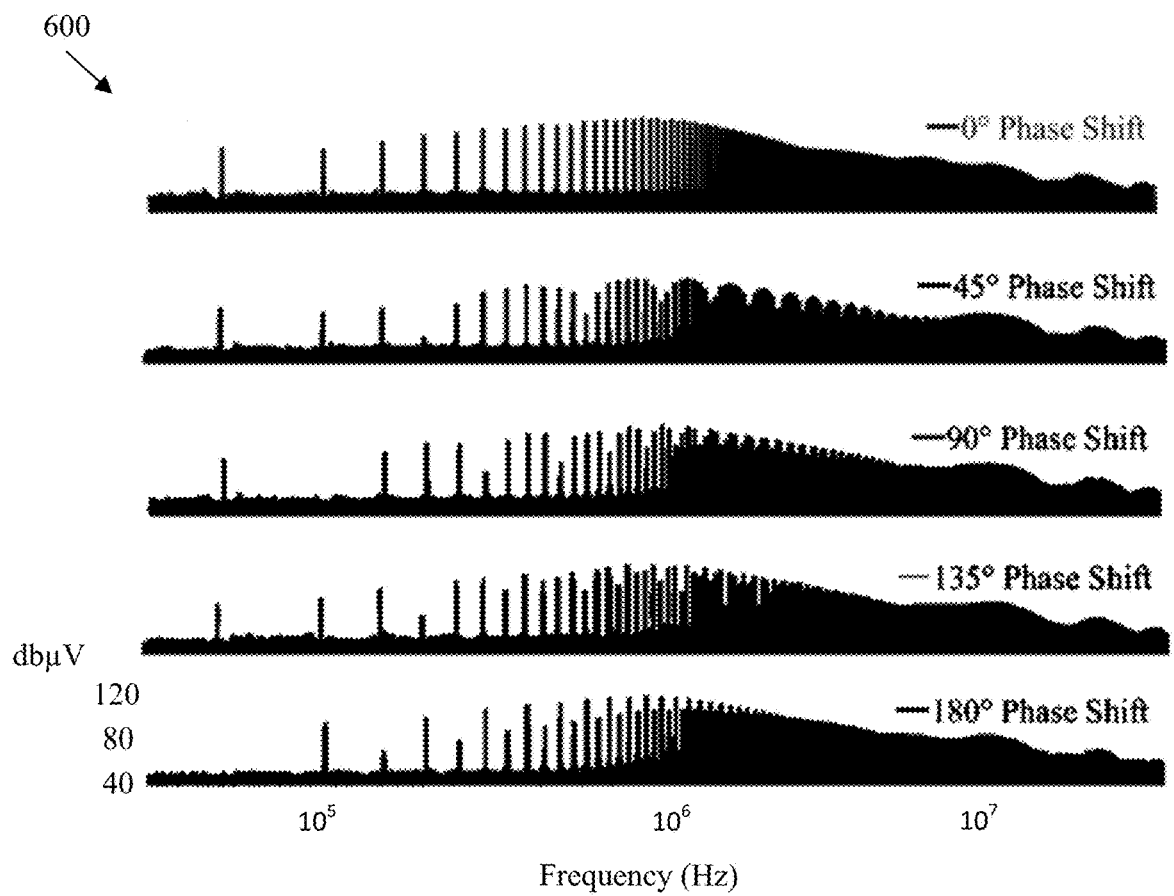
FIG. 6 is a graph illustrating EMI in the frequency domain resulting from various phase shifts.
Figure 7:
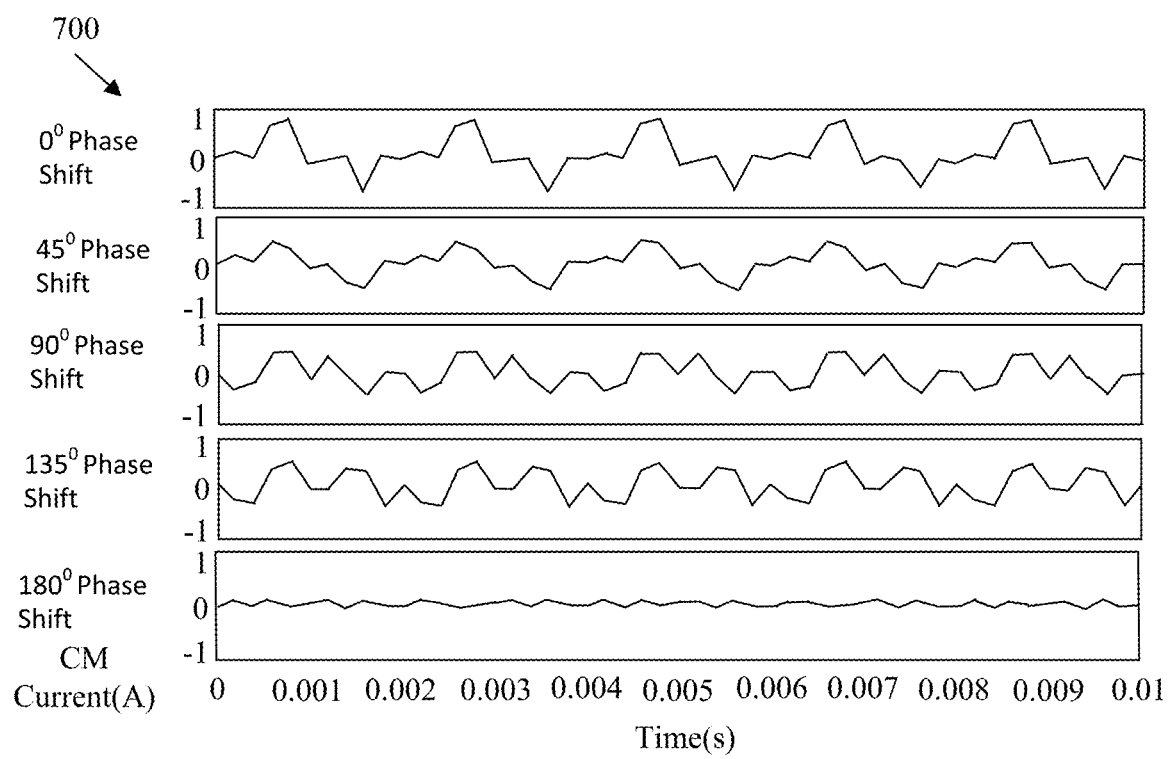
FIG. 7 is a graph illustrating EMI in the time domain resulting from various phase shifts.

Disclosed herein are mechanisms to mitigate EMI in power converter networks. Due to the complexity of modeling EMI, most systems attempt to mitigate EMI on a device by device basis, for example by using complex EMI filters. The present disclosure reduces EMI by considering the power converters as a group. Specifically, each power converter is a potential source of EMI signal. A controller is used to control the timing of each power converter in the power converter network. By altering the timing of the switches in the power converter, the controller can control the phase of the EMI signal produced by each power converter. The controller shifts the phase of the EMI signals, which are then combined in the ground plane. The result is that the phases are shifted to create destructive interference when the EMI signals output by the power converters are combined in the ground plane. This reduces the overall amount of EMI created by the power converter network. The electrical components that use the electrical output of the power converters are generally timing agnostic with respect to power input. Accordingly, shifting the phase of the EMI signals should have little or no impact on the components being powered by the power converters. As such, the controller may shift the phases of the various EMI signals as desired to create the minimum aggregate EMI. EMI filters can then be employed to filter out the remaining EMI. Reducing the aggregate EMI allows for a reduction in the complexity of the design of the EMI filters. Hence, phase shifting EMI signals in a power converter network reduces EMI and solves a problem specific to power conversion technology. As shown in FIGS. 6-7 below, experimental results indicate that such phase shifting significantly reduces EMI at and below the ten megahertz (MHz) range. While the present disclosure focuses of addressing problems related to the adoption of WBG semiconductors, the teachings of the present disclosure can be extended to power converters that employ any semiconductor technology.

Figure 1:
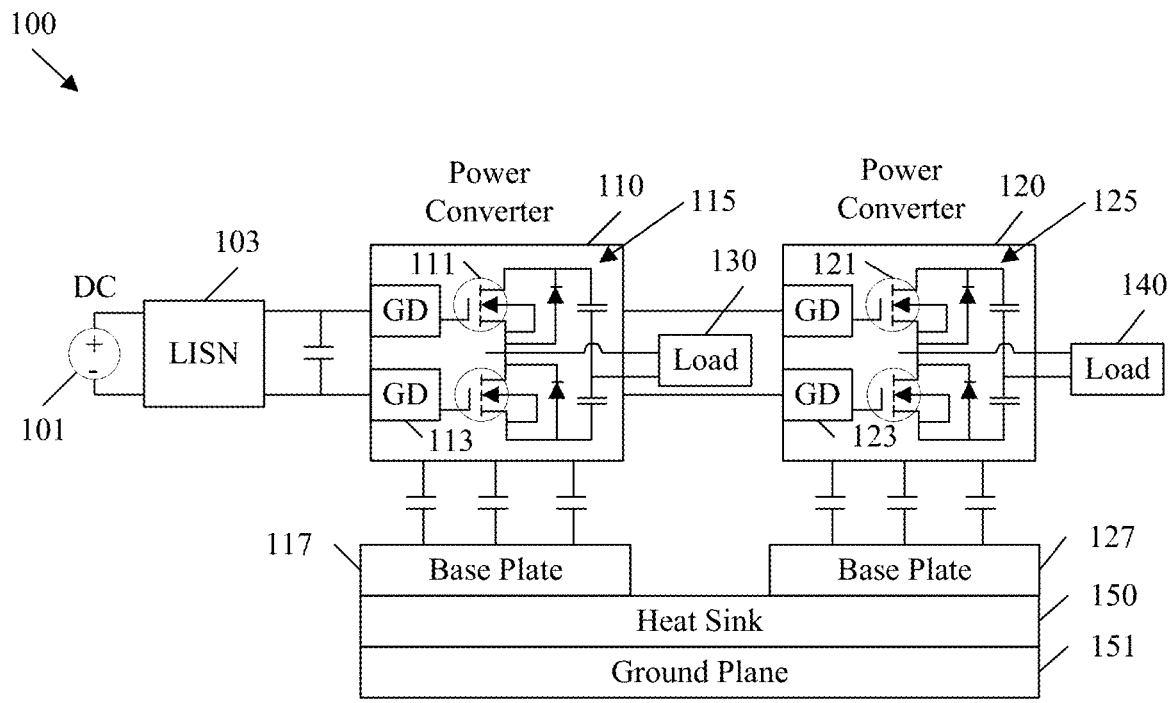
FIG. 1 is a schematic diagram of an example power converter network.

FIG. 1 is a schematic diagram of an example power converter network 100. The power converter network 100 includes a power converter 110 and a power converter 120 used to convert DC power into a form that can be used by corresponding functional electrical components that are shown as load 130 and load 140. Specifically, the power converters 110 and 120 as shown are half bridge power inverters that convert DC into single phase AC power for use by the load 130 and 140 respectively. It should be noted that the power converter network 100 is shown to simply and clearly demonstrate the principles described herein. As such, while two half bridge inverters are shown, any number of power converters of any type could be used within the scope of the present disclosure.

The power converter network 100 includes a DC power source 101, which may be any power device that produces DC power at a desired voltage and current. The DC power source 101 is coupled to a line impedance stabilization network (LISN) 103 as shown. The LISN 103 is a test component that acts as a low pass filter, creates a known impedance, and supports radio frequency (RF) noise measurement. The LISN 103 can be useful in an experimental and/or a test circuit, but may be omitted from an operational device.

The DC power output from the DC power source 101, via the LISN 103, is connected as input to the power converter 110 and the power converter 120. The power converter 110 contains gate drivers 113, switches 111, and circuits 115. Likewise, power converter 120 contains gate drivers 123, switches 121, and circuits 125, which may be substantially similar to gate drivers 113, switches 111, and circuits 115, respectively. The gate drivers 113 and 123 act as interfaces between control signals and the switches 111 and 121, respectively. For example, the gate drivers 113 and 123 may include power amplifiers that accept a low power input from a controller (not shown) and provide a high current input to control the switching functionality of the switches 111 and 121, respectively. The circuits 115 and 125 contain a plurality of inputs and outputs for the power signal from the DC power source 101 and are configured to alter the characteristics of the power signal depending on the path taken through the circuits 115 and 125. In the example shown, the circuits 115 and 125 contain inductors and capacitors that can route the current and charge and discharge, respectively, to convert a DC signal into an AC signal.

The switches 111 and 121 switch the power signal from the DC power source 101 between different inputs into the circuits 115 and 125, respectively, based on the control signals from the gate drivers 113 and 123, respectively. Accordingly, the repeated switching of the switches 111 and 121 alters the flow of the power signal and converts a flat DC input into the waves of an AC signal, which is forwarded to the loads 130 and 140, respectively. The loads 130 and 140 may be any electrical components that are configured to operate and provide desired functionality when powered by the power signal from the DC source 101 as converted by the power converters 110 and 120, respectively. In some examples, the switches 111 and 121 are Silicon (Si) based transistors. In other examples, the switches 111 and 121 are WBG semiconductors, such as Silicon Carbide (SiC) and/or gallium nitride (GaN) semiconductors.

A WBG semiconductor is a semiconductor with a bandgap in the range of two to four electronvolts (eVs). This is in contrast to a Si based semiconductor that can have a bandgap in a range of one to one and a half eVs. A bandgap is a range in a solid where no electronic states exist. For example, a bandgap can be the energy difference between the valence band and the conduction band of a semiconductor. Hence, the bandgap indicates the amount of energy difference between different switching states. As noted above, WBG semiconductors operate at higher frequencies, higher voltages, and higher temperatures than Si based semiconductors. Accordingly, WBG semiconductors can be used in a broader range of applications than Si based semiconductors.

The power converter 110 is attached to a base plate 117. Further, the power converter 120 is attached to a base plate 127. The base plates 117 and 127 are conductive pads that act as a mount to hold the power converters 110 and 120, respectively, in a desired position. The base plates 117 and 127 also provide a path to ground for corresponding circuitry. The power converters 110 and 120 are mounted to the base plates 117 and 127 in a manner that creates corresponding groups of parasitic capacitances as shown. The base plates 117 and 127 are connected to a heatsink 150. The heatsink 150 is a passive heat exchanger that transfers heat, for example from the power converters 110 and 120 to a fluid medium, for dissipation. The heatsink 150 is coupled to a ground plane 151, which acts as a shared ground for the components in the power converter network 100.

As noted above, the switches 111 and 121 are switched between states to cause the desired power conversion in the power converter 110 and 120, respectively. However, switching states at the switches 111 and 121 creates leakage currents which travel toward the ground plane 151. When the ground plane 151 is included in a vehicle, the ground plane generally cannot be connected to the earth. Hence, the ground plane 151 is not a perfect ground and is unable to completely dissipate the leakage currents. Since the ground plane 151 is shared between the power converter 110 and 120, the leakage currents from the switches 111 and 121 are combined in the ground plane 151. The leakage currents cause EMI that can interfere with the functional electrical components in the loads 130 and 140. Since the leakage currents from the switches 111 and 121 are combined in the ground plane 151, the amount of EMI created by the power converter network 100 increases with each additional switch 111 and/or 121 added to the power converter network 100. Further, WBG semiconductors operate at higher frequencies and voltages, each of which increases the amount of leakage current and therefore EMI. As such, increasing numbers of semiconductors, and particularly increasing numbers of WBG semiconductors, creates increasing EMI which interferes with the functional electrical components in the loads 130 and 140. As a particular example, an electrical automobile employing a large number of WBG semiconductors may create enough EMI to render the AM/FM radio unusable.

EMI filters can be used to mitigate this issue. However, increasing use of WBG semiconductors and increasing numbers of semiconductors used in industry creates ever increasing burdens on the EMI filters. The present disclosure includes mechanisms to mitigate this EMI issue without relying solely on the EMI filters. Specifically, the present disclosure alters the timing of the operation of the switches 111 and 121 to alter the phase of the EMI signals created by the power converters 110 and 120. When performed properly, the EMI signals from the switches 111 and 121 combine in a destructive manner instead of in an additive manner, which results in a decrease in aggregate EMI. This mechanism is shown to work with two power converters 110 and 120. However, this concept is scalable to any number of power converters 110 and 120 and/or switches 111 and 121.

Figure 2:
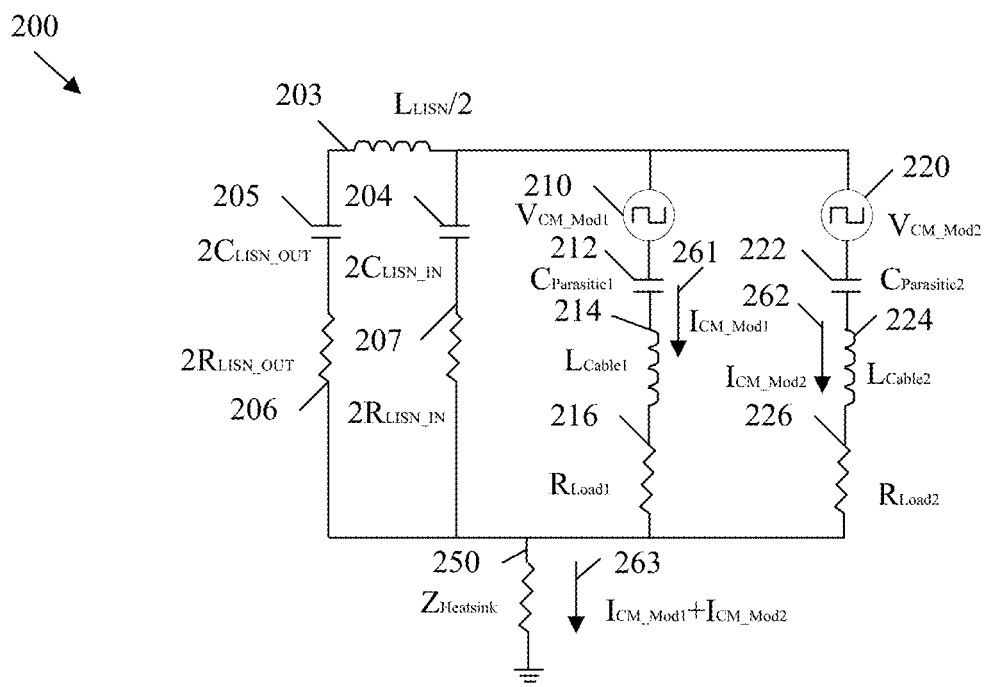
FIG. 2 is a schematic diagram of an equivalent circuit to a power converter network.

FIG. 2 is a schematic diagram of an equivalent circuit 200 to the power converter network 100, which can be used to model the EMI produced by the power converter network 100. Specifically, the circuit 200 is a simplified electrically equivalent version of the power converter network 100 determined according to Thevenin's theorem. The LISN 103 can be represented as an inductor 203, a capacitor 204, a capacitor 205, a resistor 206, and a resistor 207 connected as shown. The inductor 203 represents the inductance created by the LISN 103, can be coupled in parallel, and may be modeled with a value of $L_{lisn}/2$. The capacitor 204 and the resistor 207 represent the input capacitance and input resistance created by the LISN 103, can be coupled in series, and may be modeled with values of $C_{lisn\_in}$ and $R_{lisn\_in}$, respectively. The capacitor 205 and the resistor 206 represent the output capacitance and output resistance created by the LISN 103, can be coupled in series, and may be modeled with values of $C_{lisn\_out}$ and $R_{lisn\_out}$, respectively.

The parasitic capacitances of the power converter 110 and the power converter 120 can be collectively represented by capacitor 212 and capacitor 222, respectively. The capacitor 212 and capacitor 222 can be modeled with values of $C_{Parasitic1}$ and $C_{Parasitic2}$, respectively. Common mode (CM) voltage is created during switching the switches 111 and 121. CM voltage is a measure of voltage that is common (e.g., the same) to two or more inputs. The CM voltage of the switches 111 and 121 are represented by voltage source 210 and voltage source 220, respectively. The voltage source 210 and voltage source 220 can be modeled with values of $V_{CM\_Mod1}$ and $V_{CM\_Mod2}$, respectively. The load 130 can be collectively represented by inductor 214 and resistor 216, which can be modeled with values of $L_{cable1}$ and $R_{Load1}$, respectively. The load 140 can be collectively represented by inductor 224 and resistor 226, which can be modeled with values of $L_{Cable2}$ and $R_{Load2}$, respectively. The path to ground via the base plates 117 and 127 and the heatsink 150 can be represented as an impedance 250, which can be modeled with a value of $Z_{Heatsink}$. The CM currents, also known as leakage currents, created by the operation of the switches 111 and 121 can be represented by CM current 261 and CM current 262, respectively. The CM current 261 and CM current 262 can be modeled with values of $I_{CM\_Mod1}$ and $I_{CM\_Mod2}$, respectively. The CM current 261 and CM current 262 combine in the heatsink 150 on the way to the ground plane 151, and can therefore be represented as current 263. The current 263 can be modeled as $I_{CM\_Mod1}+I_{CM\_Mod2}$.

Although the modeling approach is explained with two half-bridge converters, for N number of branches, the leakage currents ($I_{CM\_Mod1}, I_{CM\_Mod1}, \ldots, I_{CM\_ModN}$) can be described as a Fourier series as follows:

$$I_{CM\_Mod1} = \sum_{n=1, n \neq even}^{\infty} \left( a_{nMod1} \cos\left(\frac{2\pi n x}{P} + \delta_1\right) + b_{nMod1} \sin\left(\frac{2\pi n x}{P} + \delta_1\right) \right) + \sum_{n=2, n \neq odd}^{\infty} \left( a_{nMod1} \cos\left(\frac{2\pi n x}{P} + \delta_1\right) + b_{nMod1} \sin\left(\frac{2\pi n x}{P} + \delta_1\right) \right) \quad (1)$$

$$I_{CM\_Mod2} = \sum_{n=1, n \neq even}^{\infty} \left( a_{nMod2} \cos\left(\frac{2\pi n x}{P} + \delta_2\right) + b_{nMod2} \sin\left(\frac{2\pi n x}{P} + \delta_2\right) \right) + \sum_{n=2, n \neq odd}^{\infty} \left( a_{nMod2} \cos\left(\frac{2\pi n x}{P} + \delta_2\right) + b_{nMod2} \sin\left(\frac{2\pi n x}{P} + \delta_2\right) \right) \quad (2)$$

...

$$I_{CM\_ModN} = \sum_{n=1, n \neq even}^{\infty} \left( a_{nModN} \cos\left(\frac{2\pi n x}{P} + \delta_N\right) + b_{nModN} \sin\left(\frac{2\pi n x}{P} + \delta_N\right) \right) + \sum_{n=2, n \neq odd}^{\infty} \left( a_{nModN} \cos\left(\frac{2\pi n x}{P} + \delta_N\right) + b_{nModN} \sin\left(\frac{2\pi n x}{P} + \delta_N\right) \right) \quad (3)$$

where p is the signal period, x is the measurements time, δ1, δ2, . . . , δN are the phase of each CM harmonic, the summation where n=1 describes odd harmonics, the summation where n=2 describes even harmonics, and a and b are co-efficient of the frequency components of the corresponding leakage current.

The total common mode current ($I_{CM\ total}$) measured at the ground may be the sum of CM currents according to Kirchhoff's Current Law (KCL) as follows:

$$I_{CM\ total} = I_{CM\_Mod1} + I_{CM\_Mod2} + \cdots + I_{CM\_ModN} \quad (4)$$

Further, the equivalent network CM voltage ($V_{CM}$) for $I_{CM\ total}$ can be described as follows:

$$V_{CM} = \frac{1}{C_{Eqv.}} \int_0^\tau I_{CM\ total} dt \quad (5)$$

where $C_{Eqv.}$ is the equivalent parasitic capacitance of a system. If each CM EMI's phases, which is the function of pulse width modulation (PWM) carrier, are controllable in (3), manipulating overall network CM EMI in (4) is viable. For a simple example, an odd or even harmonics of CM leakage current from different power modules in a network in (3) can be controlled to cancel each other at the ground by controlling the PWM carrier (e.g., phase).

The CM EMI from each power converter in a network is emitted as a form of leakage current, which can be computed according to $i_{CM} = C(dV_{CM}/dt)$. The leakage current occurs during the turn-on and turn-off transient of PWM pulses. Some systems assume parasitic capacitances are unpredictable, and therefore CM EMI emission may be perceived as uncontrollable. However, the relative on/off timing of PWMs between power converters can be controlled in the network, for example through a sawtooth carrier signal or triangular wave from a controller that can be emitted using an oscillator. Thus, the timing of CM EMI emission, which is equivalent to the phase of a CM EMI signal, can be programmable by a controller. For example, the average of a PWM waveform of a converter output terminal is $$y(t) = \frac{1}{T} \int_0^T f(t) dt,$$

where f(t) is the PWM pulse and T is the period. If the PWM is delayed by δ, then the PWM waveform becomes y(t)=y(t+δ), which does not affect the performance at a network. The PWM carrier signal can be configured as a hidden physical-level program continuously running in the background, and hence can be programmed or manipulated to reduce CM EMI. Further, an understanding of the on/off timing of PWM pulses in a network can facilitate modeling the CM EMI phase emitted by power converters in an extensive system.

Figure 3:
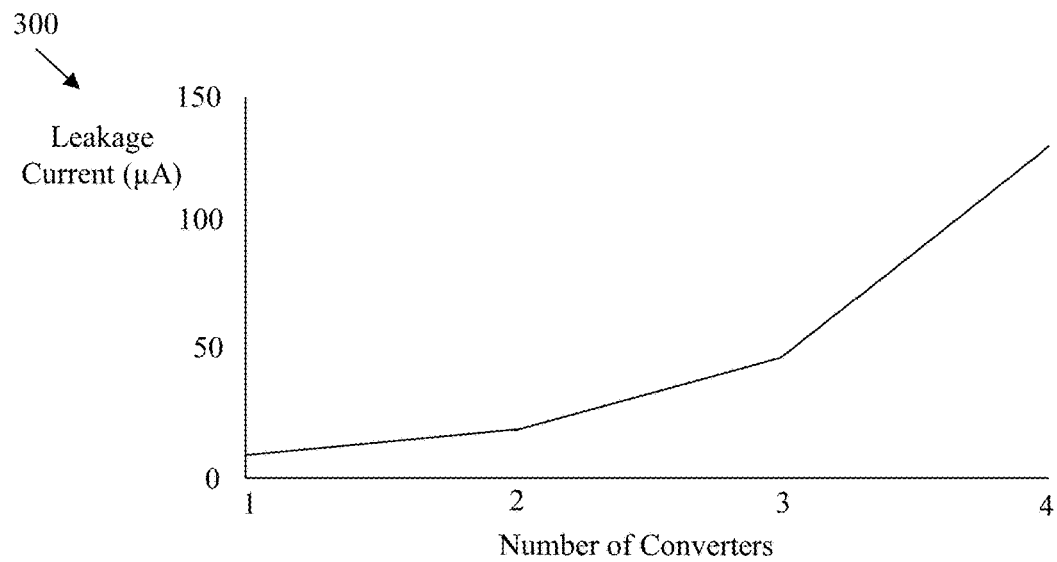
FIG. 3 is a graph illustrating leakage current versus a number of power converters.

FIG. 3 is a graph 300 illustrating leakage current versus a number of power converters, such as power converters 110 and 120. Graph 300 depicts leakage current, measured in microamps (µA) versus the number of converters in a power converter network. The leakage current results in EMI. As shown, the amount of leakage current, and hence the amount of EMI, increases exponentially with the number of converters. Hence, phase shifting to reduce EMI has an increasingly beneficial effect as more converters are added.

For example, the effect of the increasing number of converters on the overall CM EMI in a network can be investigated by measuring the leakage current flowing through the baseplate to the shared ground. In an experimental study, multiple half-bridges are connected with 100 volt (V) DC bus and operated at 50 kilohertz (kHz) switching frequency. As the number of half-bridge converters increases, an exponential increase of leakage current is observed, as shown in graph 300. For a single converter, the baseplate leakage current is 5.8 µA in the time domain, resulting in 49.24 decibel (dB) micovolt (µV) CM voltage in the frequency domain. The leakage current increases to 130.4 µA, equivalent to 76 dBµV CM voltage in frequency spectrum with four power converters. This indicates that the converter network might interfere with other devices in the frequency range of 500 kHz to 30 megahertz (MHz). Such a significant increase in network CM EMI raises considerable reliability concerns, especially in the medium and high voltage power electronics applications. Without mitigation, this issue could hinder innovative concept development of future energy systems by utilizing WBG switches.

Figure 4:
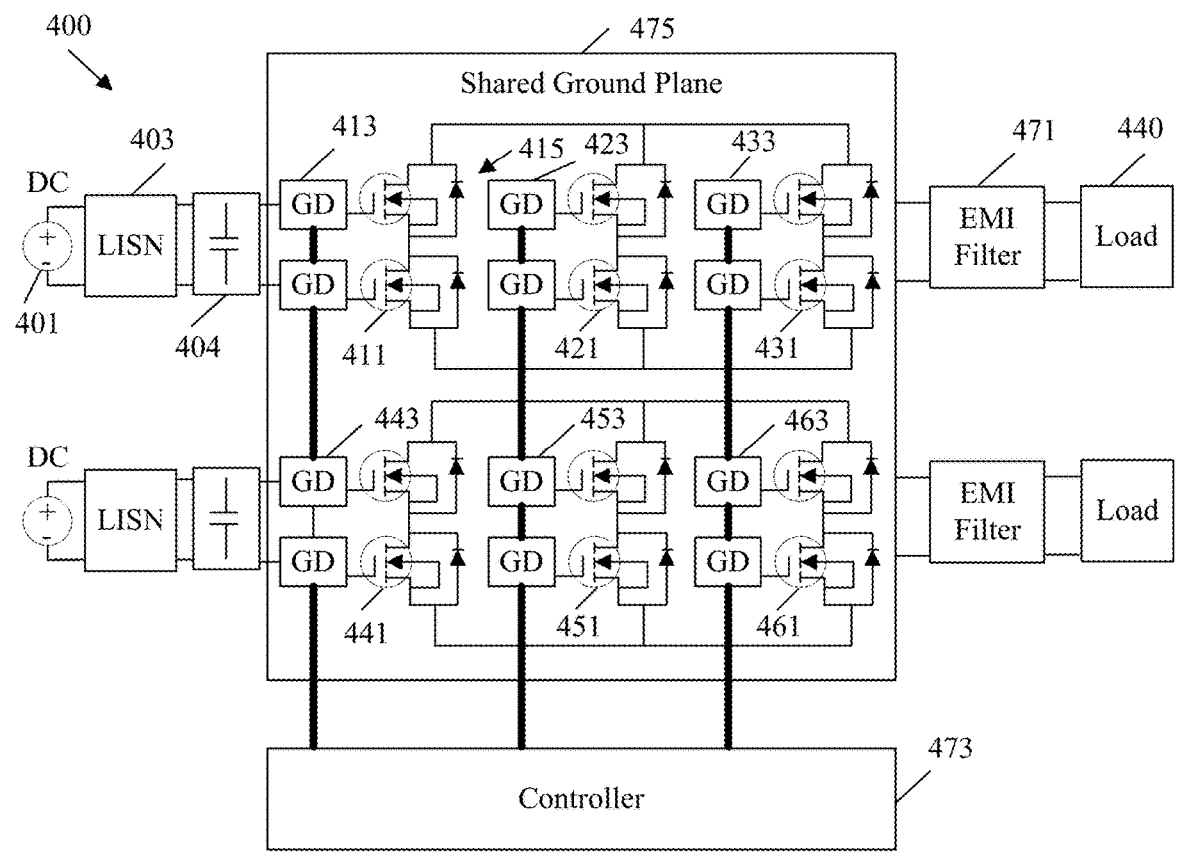
FIG. 4 is a schematic diagram of an example power converter network configured to mitigate EMI by controlling the phase of EMI produced by the power converters.

FIG. 4 is a schematic diagram of an example power converter network 400 configured to mitigate EMI by controlling the phase of EMI produced by the power converters. The power converter network 400 is similar to the power converter network 100. Specifically, the power converter network 400 includes gate drivers 413, gate drivers 423, gate drivers 433, gate drivers 443, gate drivers 453, and gate drivers 463, each of which are substantially similar to gate drivers 113 and/or 123. The power converter network 400 also includes switches 411, switches 421, switches 431, switches 441, switches 451, and switches 461, each of which are substantially similar to switches 111 and/or 121. The gate drivers 413, 423, 433, 443, 453, and 463 are coupled to, and configured to control the switching operation of, the switches 411, 421, 431, 441, 451, and 461, respectively. The switches 411, 421, 431, 441, 451, and 461 are each coupled to a circuit 415, which is substantially similar to a circuit 115 and/or 125.

The gate drivers 413, 423, 433, 443, 453, and 463 and switches 411, 421, 431, 441, 451, and 461 function as a network of six power converters connected to a shared ground plane 475, which is substantially similar to the ground plane 151. The switches 411, 421, 431, 441, 451, and 461 deliver the power of DC power source 401 to a load 440. The gate drivers 413, 423, 433, 443, 453, and 463 operate the switches 411, 421, 431, 441, 451, and 461 to alter the power delivered to the load 440. For example, each DC power source 401 may be substantially similar to a DC power source 101. In an example, each DC power source 401 is connected to one or more switches 411, 421, 431, 441, 451, and 461 via a LISN 403, and/or one or more capacitors 404. As with network 100, the LISN 403 is an optional test component that can be employed during testing to provide a known impedance and stable power to characteristics in order to isolate CM EMI that is specific to the switches 411, 421, 431, 441, 451, and 461 for analysis.

The power converter network 400 also comprises a controller 473 that is configured to activate each of the gate drivers 413, 423, 433, 443, 453, and 463, and hence control the operation of the switches 411, 421, 431, 441, 451, and 461. Specifically, the controller 473 is configured to control the timing of the switches 411, 421, 431, 441, 451, and 461 to cause the CM EMI signals created by the switches to destructively interfere with each other, and hence reduce overall CM EMI. As used herein, CM EMI is EMI from two or more signal lines that moves in the same direction toward a common ground, such as the shared ground plane 475. For example, each of the switches 411, 421, 431, 441, 451, and 461 creates leakage current, and hence EMI, each time the switch 411, 421, 431, 441, 451, and 461 is actuated/switched. The controller 473 may control the switching timing of all of the switches 411, 421, 431, 441, 451, and 461.

Accordingly, the controller 473 can send a first control signal to control the switching timing of switches 411, and hence control a first phase of a first EMI signal created by the switches 411. Further, the controller 473 can send a second control signal to control the switching timing of switches 421, and hence control a second phase of a second EMI signal created by the switches 421. Specifically, second phase of the second EMI signal can be controlled to destructively interfere with the first EMI signal at the first phase when such signals enter the shared ground plane 475. Likewise, the controller 473 can send a third control signal, a fourth control signal, a fifth control signal, and a sixth control signal to control the relative timings of the switches 431, 441, 451, and 461 to control a third phase, a fourth phase, a fifth phase, and a sixth phase, respectively, of a third EMI signal, a fourth EMI signal, a fifth EMI signal, and a sixth EMI signal, respectively. Each of these phases can be controlled to destructively interfere with the other EMI signals in the shared ground plane 475. For example, the controller 473 can control the switching timings by sending PWM signals, such as a sawtooth carrier signal or triangular wave signal, to the gate drivers 413, 423, 433, 443, 453, and 463. As such, by selection of the relevant switching timings of the switches 411, 421, 431, 441, 451, and 461, the controller 473 can cause a cancellation of components of the various EMI signals at network level instead of at the component level. By controlling CM EMI generation for the entire power converter network 400, the controller 473 can mitigate the amount of EMI generated in a scalable manner. The disclosed mechanism can be used with any number of switches to reduce the aggregate EMI created by the network. Experimental evidence suggests that controlling switching timings in this manner can significantly reduce CM EMI below at and below the ten MHz range.

The power converter network 400 may also include EMI filters 471. An EMI filter 471 is a circuit containing components that filter out EMI at predetermined frequencies. As the CM EMI of the power converter network 400 is reduced due to phase shifting of the EMI signals, the amount of EMI remaining to be filtered by the EMI filters 471 is decreased. Accordingly, the number and/or design complexity of the EMI filters 471 can be reduced as less EMI filtration is needed to meet the design constraints of the power converter network 400. Further, the load 440 are generally timing agnostic with respect to power inputs. As such, altering the timing of the switches 411, 421, 431, 441, 451, and 461 has no effect of the electrical components that rely on the power from the DC source 401 as altered by the switches 411, 421, 431, 441, 451, and 461.

Figure 5:
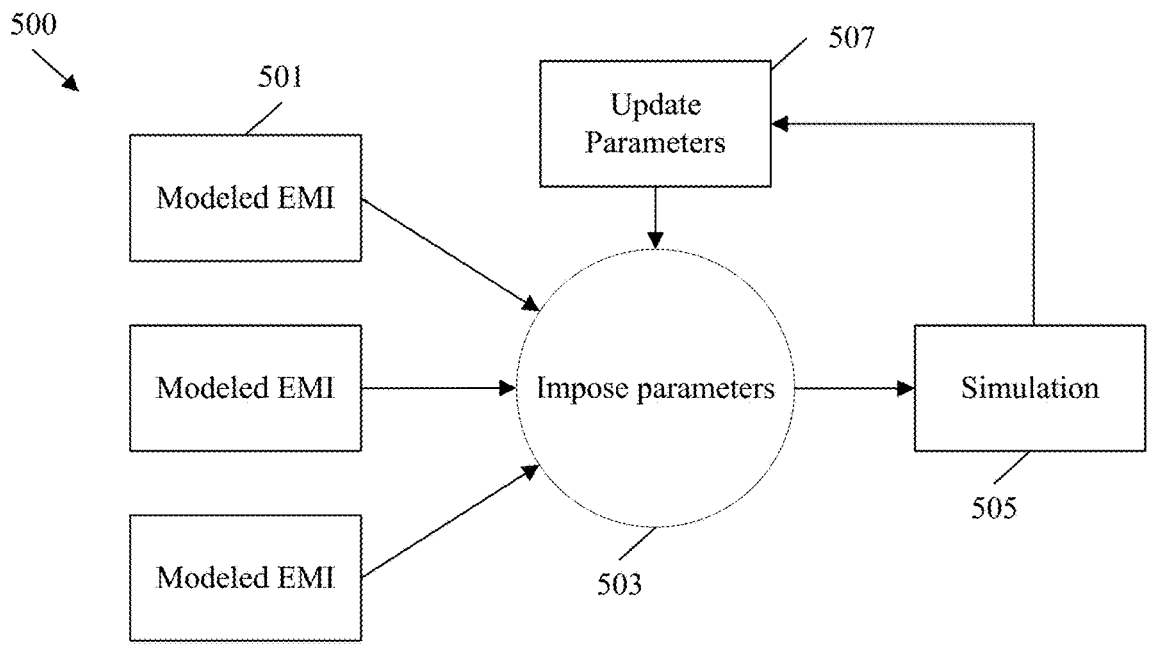
FIG. 5 is a schematic diagram of an example system for modeling EMI.

FIG. 5 is a schematic diagram of an example system 500 for modeling EMI. For example, the system 500 can be used to model EMI signals created by the switches 411, 421, 431, 441, 451, and 461, and hence can be used to determine switching timings that can be used by a controller to minimize CM EMI via destructive interference. The system 500 can be implemented in a computer system, such as one or more central processing units (CPUs) coupled to memory. The system 500 receives modeled EMI 501. The modeled EMI 501 describes expected EMI signals based on the switches that create such EMI. The system 500 imposes parameters 503 on the EMI signals. Specifically, the parameters describe switching timings of the switches described by the modeled EMI 501. The results are forwarded to simulation 505. The simulation 505 is configured to determine expected EMI reduction to the modeled EMI 501 based on the imposed parameters 503. The results can be forwarded to update parameters 507, which selects different parameters to be imposed at impose parameters 503. In this way, different parameters can be simulated and the optimal set of parameters selected for use by a controller selected to operate in a system with switches that correspond to the modeled EMI 501.

An example set of computations that can be used for modeling are now described. To observe the effect of phase, a PWM phase difference can been applied between two power converters, as discussed above. A generalized transient CM current from each power module can be expressed as follows:

$$I_{CM\ Module} = A_{parasitic} e^{-\alpha t} \cos(2\pi f_0 t - \delta_{parasitic}) \quad (6)$$

where A and δ are the amplitude and the phase of a CM current, respectively, and α is the attenuation coefficient. The phase shift in the carrier, M, results in a phase delay Δδ between two CM currents Consequently, an example CM voltage may be reduced by about 12~19V in the time domain Although there may be an additional 17~48V CM voltage oscillations, they contribute to even harmonics in the network, which eventually cancel each other out in a periodical signal.

Such CM EMI harmonic reductions are observed under various phase shifts between carriers of each power converter. In an example with two power converters, the maximum harmonic reductions are observed when the carriers have a Δδ=180 degree)(° phase shift. This results in an attenuation of CM EMI peaks at the odd harmonics of CM EMI. This is summarized in Table 1. As used herein, a harmonic is a frequency component that is part of a harmonic series.

CM EMI Harmonics Reduction

TABLE 1

| Number of Power Converters | Δδ | Reduced Harmonics |
|---|---|---|
| 2 | 45° | $4^{th}$ harmonic |
| 2 | 90° | $2^{nd}$ and $6^{th}$ harmonic |
| 2 | 135° | $4^{th}$ harmonic |
| 2 | 180° | $1^{st}$, $3^{rd}$, $5^{th}$, $7^{th}$, $9^{th}$, and other odd harmonics |

As described above, the CM EMI can be amplified or canceled through phase control. Hence, phase modeling of the CM currents can be used to understand a large network's overall EMI variations. By utilizing equation (6), the CM current in a network of two half-bridge converters can be expressed as follows:

$$I_{CM\ Mod1} = A_{C_{U1}} e^{-\alpha t} \cos(2\pi f_0 t - \delta_{C_{U1}}) + A_{C_{L1}} e^{-\alpha t} \cos(2\pi f_0 t - \delta_{C_{L1}}) + A_{C_{A1}} e^{-\alpha t} \cos(2\pi f_0 t - \delta_{C_{A1}}) \quad (7)$$

$$I_{CM\ Mod2} = A_{C_{U2}} e^{-\alpha t} \cos(2\pi f_0 t - \delta_{C_{U2}}) + A_{C_{L2}} e^{-\alpha t} \cos(2\pi f_0 t - \delta_{C_{L2}}) + A_{C_{A2}} e^{-\alpha t} \cos(2\pi f_0 t - \delta_{C_{A2}}) \quad (8)$$

where $I_{CM\_Mod1}$ and $I_{CM\_Mod2}$ are the branch currents in a networked power converter. To simplify the derivation, the circuit 200 can be simplified by replacing LISN 103 with a single impedance value $Z_{lisn}$ by paralleling each individual impedance network. Additionally, the parasitic impedances can be denoted with $X_{par1}$ and $X_{par2}$ and the load branches of each converter are replaced with single load blocks: $Z_{load1}$ and $Z_{load2}$. The resulting individual loop currents are denoted as $i_1$ and $i_2$. Kirchhoff's Voltage Law (KVL) is applied to determine the loop current relation with the corresponding branch's CM voltage as follows:

$$\begin{bmatrix} \frac{Z_{lisn}}{2} - jx_{par1} + Z_{load1} & -Z_{load1} \\ -Z_{load1} + jx_{par1} & -jx_{par2} + Z_{load2} + Z_{load1} - jx_{par1} \end{bmatrix} \quad (9)$$

$$\begin{bmatrix} i_1 \\ i_2 \end{bmatrix} = \begin{bmatrix} V_{CM\_Mod1} \\ V_{CM\_Mod1} - V_{CM\_Mod2} \end{bmatrix}$$

The CM current is the vector sum of the current that flows through the parasitic capacitances to the ground. The coefficients of $i_1$ in (9) are $$A = \left[ \frac{Z_{lisn}}{2} - jx_{par1} + Z_{load1} \right]$$

and $C=[-Z_{load1}+jx_{par1}]$. The coefficients of $i_2$ are $B=[-Z_{load1}]$ and $D=[Z_{load1}+Z_{load2}+j(x_{par1}+x_{par2})]$. In the networked converter, all the branch parasitic and loads connected at the output are considered identical for simplicity. When no phase modulation is applied in the branches, the CM voltages $V_{CM\_Mod1}$ and $V_{CM\_Mod2}$ can be considered equal in amplitude. Therefore, the second row of the right-hand side of (9) becomes zero. By solving (9) for $i_1$ and $i_2$, the CM current ($I_{CM\ total}$) flowing through the heatsink after subtracting $i_1$ from $i_2$ is determined as follows:

$$I_{CM\ total} = i_1 - i_2 = \frac{Z_{load1} + Z_{load2} - jx_{par1} - jx_{par2}}{AD - BC} \quad (10)$$

When a 180° phase shift is applied between the gate pulses of the two half-bridge converters, the parameter at the second row of (9) can be of two values: $V_{CM\_Mod1}$ ($0 < t < T_{period}/2$) or $-V_{CM\_Mod1}$ (considering $V_{CM\_Mod1} = V_{CM\_Mod2}$) ($T_{period}/2 < t < T_{period}$). In the first half cycle, the CM current can be derived as follows:

$$I_{CM\ total} = \frac{2Z_{load1} + Z_{load2} - jx_{par1} - jx_{par2}}{AD - BC} \quad (11)$$

The numerator in (11) increases by a factor of $$\frac{Z_{load1}}{AD - BC}$$

compared to (10). Finally in the consecutive half cycle, the CM current can be calculated as follows:

$$I_{CM\ total} = \frac{Z_{load2} - jx_{par1} - jx_{par2}}{AD - BC} \quad (12)$$

In the above cases, the denominator AD-BC can be derived as (13):

$$AD - BC = \frac{Z_{lisn}}{2}(Z_{load1} + Z_{load2}) + Z_{load1}Z_{load2} - x_{par1}(x_{par1} + x_{par2}) - \quad (13)$$
$$j\left[ \frac{Z_{lisn}}{2}(x_{par1} + x_{par2}) + Z_{load1}(x_{par1} + x_{par2}) + x_{par1}Z_{load2} \right]$$

Comparing the numerator of (10), (11), and (12), one can notice that although during the first half cycle, the phase-shifting increases the even harmonics of EMI current in (11), the phase shifting decreases the odd harmonics by a factor of $$\frac{Z_{load1}}{AD - BC}$$

in the next half-cycle in (12). By reducing the odd harmonics of CM current in a network structure, the carrier phase-shifting topology works effectively as a virtual EMI filter and improves the power quality of a power electronics-enabled power system.

FIG. 6 is a graph 600 illustrating EMI in the frequency domain resulting from various phase shifts. For example, graph 600 describes the EMI created by a power converter network such as power converter network 400 when the controller 473 changes switching timing to shift the phase of the EMI signals. It should be noted that the graph 600 illustrates the EMI for a network with two power converters. However, similar observations can be made for graphs based on additional power converters. The graph 600 illustrates the frequency components of the EMI signals in units of Hz versus dBµV at various phase shifts. As shown, the EMI signals are at a maximum when no phase shift is applied. When a 45° phase shift is employed, some of the frequency components are reduced. When a 90° phase shift is employed, some of the frequency components are reduced further. A 135° phase shift reduces the frequency components to similar levels as the 90° phase shift. A 180° phase shift results in the greatest reduction in frequency components in the EMI signal. However, it should be noted that the optimal phase shift may vary when additional power converters are added to the network.

FIG. 7 is a graph 700 illustrating EMI in the time domain resulting from various phase shifts. For example, graph 700 describes the EMI created by a power converter network such as power converter network 400 when the controller 473 changes switching timing to shift the phase of the EMI signals. Graph 700 is similar to graph 600, but illustrates changes in CM EMI related current in Amps (A) over time in seconds (s). As shown, the amount of current is greatest when there is no phase shift. When a 45° phase shift is employed, the current is reduced. When a 90° phase shift is employed, the current is further reduced. A 135° phase shift reduces the current to similar levels as the 90° phase shift. A 180° phase shift results in the greatest CM EMI related current.

Figure 8:
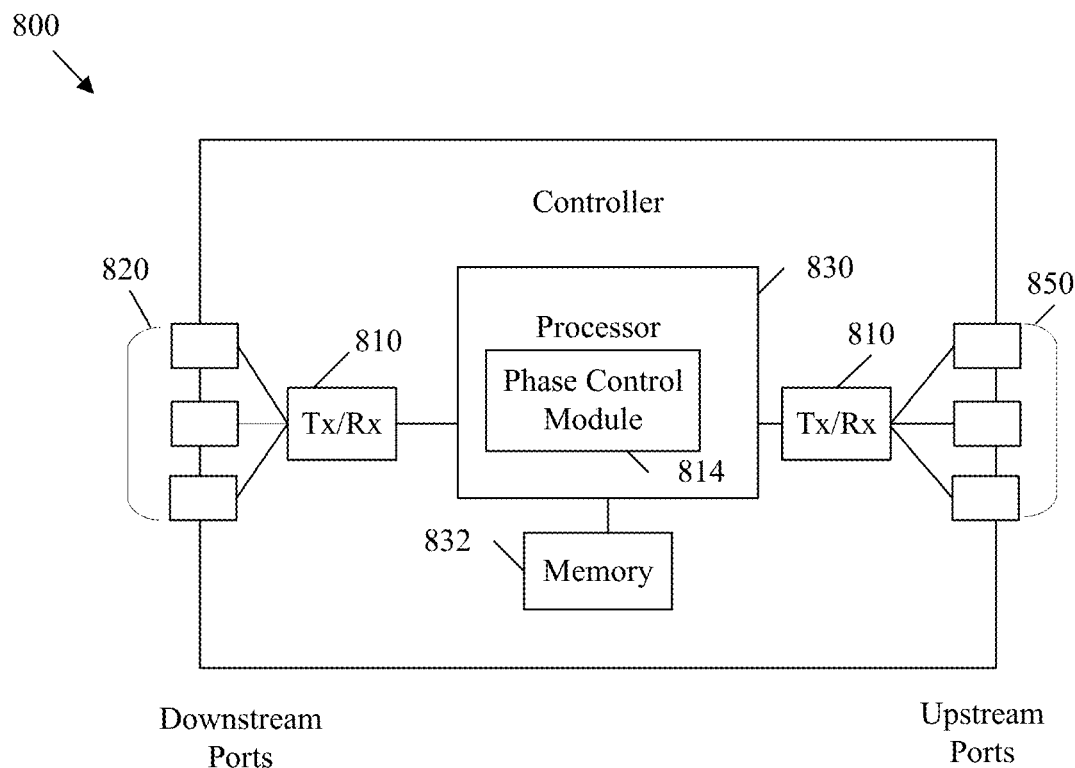
FIG. 8 is a schematic diagram of an example controller.

FIG. 8 is a schematic diagram of an example controller 800, which can be used to implement a controller 473 and/or the hardware for a system 500. Further, the controller 800 can be used to implement method 900. Hence, the controller 800 is suitable for implementing the disclosed examples/embodiments as described herein. The controller 800 comprises downstream ports 820, upstream ports 850, and/or one or more transceiver units (Tx/Rx) 810, including transmitters and/or receivers for communicating data upstream and/or downstream over a network. The controller 800 also includes a processor 830 including a logic unit and/or central processing unit (CPU) to process the data and a memory 832 for storing the data. The controller 800 may also comprise optical-to-electrical (OE) components, electrical-to-optical (EO) components, and/or wireless communication components coupled to the upstream ports 850 and/or downstream ports 820 for communication of data via electrical, optical, and/or wireless communication networks.

The processor 830 is implemented by hardware and software. The processor 830 may be implemented as one or more CPU chips, cores (e.g., as a multi-core processor), field-programmable gate arrays (FPGAs), application specific integrated circuits (ASICs), digital signal processors (DSPs), or any combination of the foregoing. The processor 830 is in communication with the downstream ports 820, Tx/Rx 810, upstream ports 850, and memory 832. The processor 830 comprises a phase control module 814. The phase control module 814 may implement one or more of the disclosed embodiments described herein.

In an example, the phase control module 814 can simulate EMI resulting from various switches and determine optimal switching timing parameters for such switches to phase shift EMI signals and cause an overall reduction of EMI in a power converter network. In another example, the phase control module 814 can control switches, for example via gate drives. In such a case, the phase control module 814 can employ parameters to control the timing of the switches in the power converter network in order to shift the phase of resulting EMI signals. This results in creating destructive interference between the EMI signals and reducing overall EMI in the power converter network. Accordingly, the phase control module 814 may be configured to perform mechanisms to address one or more of the problems discussed above. As such, the phase control module 814 improves the functionality of the controller 800 as well as addresses problems that are specific to the electrical arts. Further, the phase control module 814 effects a transformation of the controller 800 to a different state. Alternatively, the phase control module 814 can be implemented as instructions stored in the memory 832 and executed by the processor 830 (e.g., as a computer program product stored on a non-transitory medium).

The memory 832 comprises one or more memory types such as disks, tape drives, solid-state drives, read only memory (ROM), random access memory (RAM), flash memory, ternary content-addressable memory (TCAM), static random-access memory (SRAM), and other optical and/or electrical memory systems suitable for this task. The memory 832 may be used as an over-flow data storage device, to store programs when such programs are selected for execution, and to store instructions and data that are read during program execution.

Figure 9:
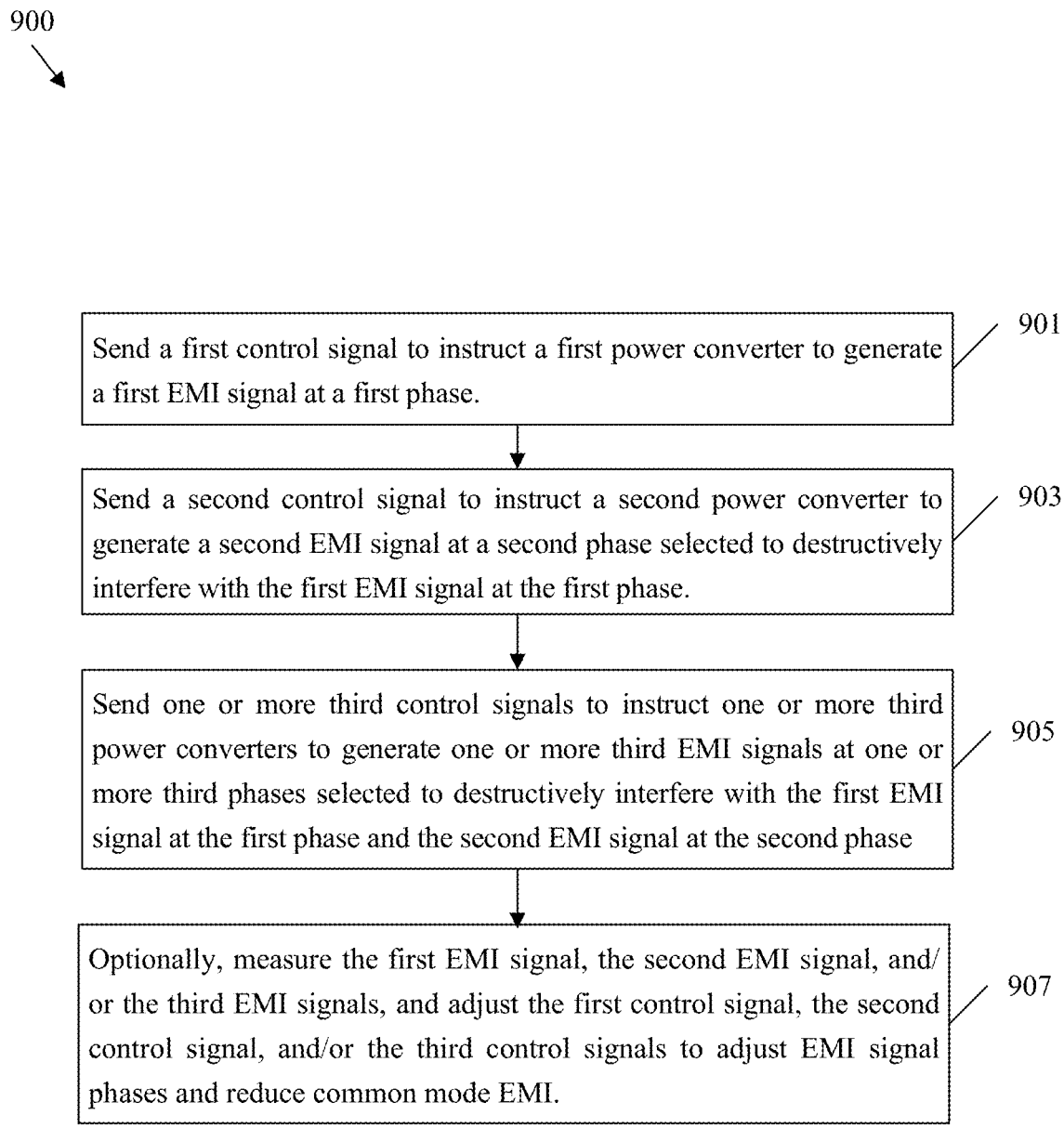
FIG. 9 is a flowchart of an example method of mitigating EMI by controlling EMI phase.

FIG. 9 is a flowchart of an example method 900 of mitigating EMI by controlling EMI phase. For example, the method 900 can be implemented in a controller 800 and/or a controller 473 in a power converter network 400. The method 900 may begin when the controller is activated and begins controlling a group of switches in power converters in a power converter network. At step 901, the controller sends a first control signal to instruct a first power converter in the power converter network to generate a first EMI signal at a first phase. In an example, the first control signal controls the first phase of the first EMI signal by controlling switching timing of the first power converter.

At step 903, the controller sends a second control signal to instruct a second power converter to generate a second EMI signal at a second phase selected to destructively interfere with the first EMI signal at the first phase. In an example, the second control signal controls the second phase of the second EMI signal by controlling switching timing of the second power converter. In a specific example, the first EMI signal and the second EMI signal traverse a power converter network in a same direction toward a shared ground to create CM EMI. As a specific example, the first control signal and the second control signal are PWM signals such as a sawtooth carrier signal or triangular wave. The destructive interference between the first EMI signal and the second EMI signal reduces common mode ground current in the power converter network. For example, the destructive interference between the first EMI signal and the second EMI signal reduces harmonics in the common mode ground current in a low frequency range at or below ten MHz. In an example, the first power converter and the second power converter include wide bandgap semiconductors, such as SiC, GaN, or combinations thereof.

At step 905, the controller can further send one or more third control signals to instruct one or more third power converters to generate one or more third EMI signals at one or more third phases selected to destructively interfere with the first EMI signal at the first phase and the second EMI signal at the second phase. The third control signals may include any number of control signals. The third power converters may include any number of power converters. The third EMI signals may include any number of EMI signals. The third phases may include any number of phases. The third EMI signals can destructively interfere with other EMI signals in a similar manner to the second EMI signal's interference with the first EMI signal.

At optional step 907, the controller may include sensors and may be configured to measure the first EMI signal, the second EMI signal, and/or the third EMI signals. The controller can then adjust the first control signal, the second control signal, and/or the third control signal in response to the measurements in order to adjust the corresponding EMI signal phases in order to further reduce CM EMI.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   coupling a controller to a circuit including a first power converter, wherein the first power converter is mounted to a first conductive base plate, wherein the first conductive base plate is connected to a heat sink, wherein the circuit further includes a second power converter, wherein the second power converter is mounted to a second conductive base plate, wherein the second conductive base plate is connected to the heat sink, and wherein the heat sink is connected to a common ground plane that is common to both the first power converter and the second power converter;

controlling, by the controller coupled to the circuit, the first power converter to generate a first electromagnetic interference (EMI) signal having a first phase by controlling switching timing of the first power converter; and controlling, by the controller coupled to the circuit, the second power converter to generate a second EMI signal by controlling switching timing of the second power converter, the second EMI signal having a second phase that is selected based on the first phase and that is selected to reduce EMI in the circuit by destructively interfering with the first EMI signal at the first phase when the first EMI signal generated by the first power converter and the second EMI signal generated by the second power converter enter the common ground plane through the first and second conductive base plates and the heat sink.

2. The method of claim 1, wherein the first EMI signal and the second EMI signal traverse a power converter network in a same direction to create common mode EMI.

3. The method of claim 1, wherein the controller coupled to the circuit controls the first power converter and the second power converter using pulse width modulation (PWM) signals.

4. The method of claim 1, wherein destructive interference between the first EMI signal and the second EMI signal reduces common mode ground current in a power converter network.

5. The method of claim 4, wherein the destructive interference between the first EMI signal and the second EMI signal reduces harmonics in the common mode ground current in a low frequency range at or below ten megahertz (MHz).

6. The method of claim 1, wherein the first power converter and the second power converter include wide bandgap semiconductors.

7. The method of claim 6, wherein the wide bandgap semiconductors are Silicon Carbide (SiC), gallium nitride (GaN), or combinations thereof.

8. The method of claim 1, further comprising controlling one or more third power converters to generate one or more third EMI signals at one or more third phases selected to destructively interfere with the first EMI signal at the first phase and the second EMI signal at the second phase.

9. A controller configured to:

couple to a circuit including a first power converter and, wherein the first power converter is mounted to a first conductive base plate, wherein the first conductive base plate is connected to a heat sink, wherein the circuit further includes a second power converter, wherein the second power converter is mounted to a second conductive base plate, wherein the second conductive base plate is connected to the heat sink, and wherein the heat sink is connected to a common ground plane that is common to both the first power converter and the second power converter;

control the first power converter to generate a first electromagnetic interference (EMI) signal having a first phase by controlling switching timing of the first power converter; and control the second power converter to generate a second EMI signal by controlling switching timing of the second power converter, the second EMI signal having a second phase that is selected based on the first phase and that is selected to reduce EMI in the circuit by destructively interfering with the first EMI signal at the first phase when the first EMI signal generated by the first power converter and the second EMI signal generated by the second power converter enter the common ground plane through the first and second conductive base plates and the heat sink.

10. The controller of claim 9, wherein the first EMI signal and the second EMI signal traverse a power converter network in a same direction to create common mode EMI.

11. The controller of claim 9, further configured to control the first power converter and the second power converter using pulse width modulation (PWM) signals.

12. The controller of claim 9, wherein destructive interference between the first EMI signal and the second EMI signal reduces common mode ground current in a power converter network.

13. The controller of claim 12, wherein the destructive interference between the first EMI signal and the second EMI signal reduces harmonics in the common mode ground current in a low frequency range at or below ten megahertz (MHz).

14. The controller of claim 9, further configured to control one or more third power converters to generate one or more third EMI signals at one or more third phases selected to destructively interfere with the first EMI signal at the first phase and the second EMI signal at the second phase.

15. A non-transitory computer readable medium comprising a computer program product for use by a controller, the computer program product comprising computer executable instructions stored on the non-transitory computer readable medium such that when executed by a processor cause the controller to:

control a first power converter to generate a first electromagnetic interference (EMI) signal having a first phase by controlling switching timing of the first power converter, wherein the controller is coupled to a circuit including the first power converter, wherein the first power converter is mounted to a first conductive base plate, wherein the first conductive base plate is connected to a heat sink, wherein the circuit further includes a second power converter, wherein the second power converter is mounted to a second conductive base plate, wherein the second conductive base plate is connected to the heat sink, and wherein the heat sink is connected to a common ground plane that is common to both the first power converter and the second power converter; and control the second power converter to generate a second EMI signal by controlling switching timing of the second power converter, the second EMI signal having a second phase that is selected to reduce EMI in the circuit by destructively interfering with the first EMI signal at the first phase when the first EMI signal generated by the first power converter and the second EMI signal generated by the second power converter enter the common ground plane through the first and second conductive base plates and the heat sink.

16. The non-transitory computer readable medium of claim 15, wherein the first EMI signal and the second EMI signal traverse a power converter network in a same direction to create common mode EMI.

17. The non-transitory computer readable medium of claim 15, wherein the computer executable instructions further cause the controller to control one or more third power converters to generate one or more third EMI signals at one or more third phases selected to destructively interfere with the first EMI signal at the first phase and the second EMI signal at the second phase.

* * * * *